US008794647B2

(12) United States Patent
Moessinger

(10) Patent No.: US 8,794,647 B2
(45) Date of Patent: Aug. 5, 2014

(54) INDEPENDENT WHEEL SUSPENSION SYSTEM FOR A MOTOR VEHICLE

(71) Applicant: Dr. Ing. h.c. F. Porsche Aktiengesellschaft, Stuttgart (DE)

(72) Inventor: Oliver Moessinger, Forst (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 13/845,202

(22) Filed: Mar. 18, 2013

(65) Prior Publication Data

US 2013/0249182 A1 Sep. 26, 2013

(30) Foreign Application Priority Data

Mar. 22, 2012 (DE) .......................... 10 2012 102 436

(51) Int. Cl.
*B60G 3/20* (2006.01)
*B60G 7/02* (2006.01)
*B60G 7/00* (2006.01)

(52) U.S. Cl.
CPC .. *B60G 3/20* (2013.01); *B60G 7/02* (2013.01); *B60G 7/001* (2013.01); *B60G 2200/1442* (2013.01); *B60G 2200/184* (2013.01)
USPC .............................. 280/124.138; 280/124.148

(58) Field of Classification Search
CPC ............ B60G 3/18; B60G 3/20; B60G 3/202; B60G 3/207; B60G 7/02; B60G 7/008; B60G 7/04; B60G 7/001; B60G 2200/144; B60G 2200/1442; B60G 2200/18; B60G 2200/184; B60G 2204/143; B60G 2204/148

USPC ................... 280/124.135, 124.136, 124.138, 280/124.139, 124.148
See application file for complete search history.

(56) References Cited

U.S. PATENT DOCUMENTS

| 3,883,152 A * | 5/1975 | De Carbon ............. 280/124.138 |
| 4,530,513 A * | 7/1985 | Kijima et al. .......... 280/124.128 |
| 4,798,396 A * | 1/1989 | Minakawa ............. 280/124.138 |
| 5,022,673 A * | 6/1991 | Sekino et al. .......... 280/124.138 |
| 5,179,759 A | 1/1993 | Epple et al. |
| 7,712,748 B2 * | 5/2010 | Deal et al. .................. 280/5.521 |
| 7,967,310 B2 * | 6/2011 | Frasch et al. ........... 280/124.143 |
| 2003/0107201 A1* | 6/2003 | Chun ..................... 280/124.135 |

(Continued)

FOREIGN PATENT DOCUMENTS

| DE | 2535670 A1 | 2/1977 |
| DE | 3022055 C2 | 12/1981 |

(Continued)

*Primary Examiner* — Drew Brown
(74) *Attorney, Agent, or Firm* — Leydig, Voit & Mayer, Ltd.

(57) ABSTRACT

An independent wheel suspension system for a motor vehicle includes an upper strut plane and a lower strut plane. Each of the upper strut plane and lower strut planes includes one longitudinal strut and one transverse strut. Each of the struts has a wheel side end for connection of a wheel holder and a body side end for connection of a body. The wheel-side ends of the longitudinal struts and the wheel-side ends of the transverse struts of the two strut planes are articulatedly connected either directly or indirectly to the wheel holder. The body-side ends of first struts of the two strut planes are articulatedly connected directly to the body. The body-side ends of second struts of the two strut planes are articulatedly connected indirectly to the body via a common coupling element.

12 Claims, 6 Drawing Sheets

(56) References Cited

U.S. PATENT DOCUMENTS

2007/0114748 A1* 5/2007 Seethaler et al. ...... 280/124.135
2008/0042329 A1* 2/2008 Deal et al. ...................... 267/2
2013/0093154 A1* 4/2013 Cordier et al. ......... 280/124.109

FOREIGN PATENT DOCUMENTS

| DE | 3721026 | A2 | 1/1988 |
| EP | 0348214 | A2 | 12/1989 |
| JP | 2525681 | A2 | 8/1996 |

* cited by examiner

INDEPENDENT WHEEL SUSPENSION SYSTEM FOR A MOTOR VEHICLE

CROSS REFERENCE TO RELATED APPLICATIONS

This application claims priority to German Patent Application No. DE 10 2012 102 436.7, filed Mar. 22, 2012, which is hereby incorporated by reference herein in its entirety.

FIELD

The invention relates to an independent wheel suspension system for a motor vehicle. The invention also relates to a coupling element of an independent wheel suspension system.

BACKGROUND

DE 37 21 026 A1 discloses an independent wheel suspension system for a motor vehicle, which independent wheel suspension system comprises an upper strut plane and a lower strut plane. In said prior art, both the upper strut plane and also the lower strut plane are formed in each case by a triangular strut, wherein each triangular strut of the two strut planes is articulatedly connected with in each case one wheel-side end to a wheel holder and with in each case two body-side ends to a body of the motor vehicle.

SUMMARY

In an embodiment, the present invention provides an independent wheel suspension system for a motor vehicle includes an upper strut plane and a lower strut plane. Each of the upper strut plane and lower strut planes includes one longitudinal strut and one transverse strut. Each of the struts has a wheel side end for connection of a wheel holder and a body side end for connection of a body. The wheel-side ends of the longitudinal struts and the wheel-side ends of the transverse struts of the two strut planes are articulatedly connected either directly or indirectly to the wheel holder. The body-side ends of first struts of the two strut planes are articulatedly connected directly to the body. The body-side ends of second struts of the two strut planes are articulatedly connected indirectly to the body via a common coupling element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
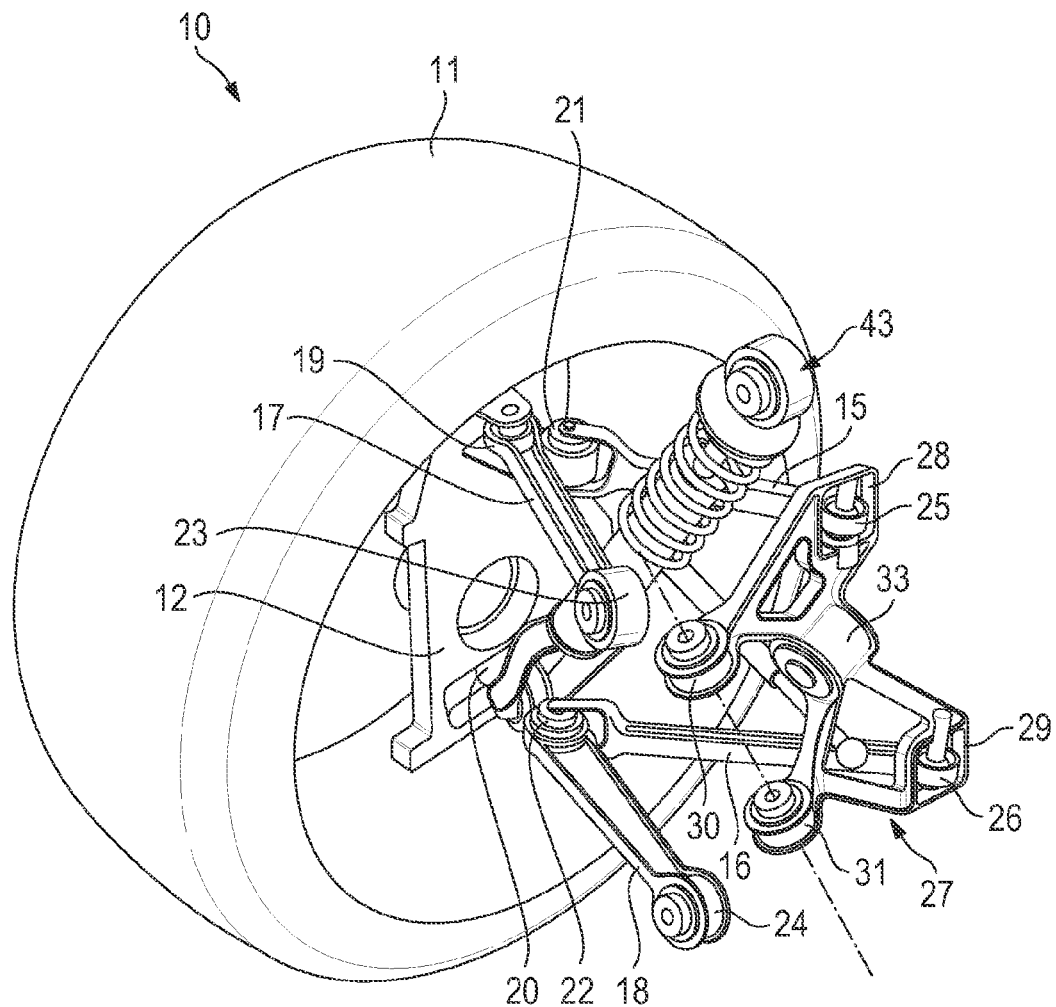
FIG. 1 shows an independent wheel suspension system according to the invention for a motor vehicle in a first perspective view.

In an embodiment, the present invention provides a novel independent wheel suspension system for a motor vehicle and a coupling element of an independent wheel suspension system by means of which considerably improved elastokinematic characteristics under the action of longitudinal and side forces (increased caster and camber stiffness) can be attained.

According to the invention, the upper strut plane and the lower strut plane comprise in each case one longitudinal strut and in each case one transverse strut, wherein the wheel-side ends of the longitudinal struts and the wheel-side ends of the transverse struts of the two strut planes are articulatedly connected either directly or indirectly to the wheel holder, wherein the body-side ends of first struts, in particular of the transverse struts, of the two strut planes are articulatedly connected directly to the body, and wherein the body-side ends of second struts, in particular of the longitudinal struts, of the two strut planes are articulatedly connected indirectly to the body via a common coupling element. In other words, the two strut planes are formed by in each case one transverse strut and one longitudinal strut, wherein the additional coupling element receives the body-side end of in each case one strut of the two strut planes and itself is mounted so as to be rotatable with respect to the body with a defined rotational stiffness. In this way, high caster stiffness under the action of longitudinal forces is attained and high camber stiffness under the action of side forces is attained.

The present invention proposes a completely novel independent wheel suspension system for a motor vehicle. Each strut plane, that is to say both the upper strut plane and also the lower strut plane of the independent wheel suspension system, comprises in each case one longitudinal strut and in each case one transverse strut. The wheel-side ends of the longitudinal struts and of the transverse struts are articulatedly connected to the wheel holder, specifically either directly or indirectly.

The body-side ends of first struts, in particular of the transverse struts, are connected directly to the body, whereas the body-side ends of second struts, in particular of the longitudinal struts, are articulatedly connected indirectly to the body via a common coupling element.

An independent wheel suspension system of said type has completely novel elastokinematic characteristics. The independent wheel suspension system is characterized by a small caster change under the action of longitudinal forces. Under the action of side forces, the independent wheel suspension system according to the invention is characterized by only a small positive camber change, wherein a negative camber change may also be attained depending on the configuration of the bearing points and stiffnesses. In this way, it is possible to attain advantageous driving characteristics of a motor vehicle having an independent wheel suspension system of said type.

It is preferable for the body-side ends of the second struts, in particular of the longitudinal struts, of the two strut planes to be articulatedly connected to first portions of the common coupling element, wherein the common coupling element is articulatedly connected via second portions to the body, and wherein the second portions of the common coupling element preferably define an axis of rotation about which the coupling element can rotate relative to the body. The above configuration of the independent wheel suspension system is particularly advantageous. The coupling element provides positive coupling of the two longitudinal struts of the two strut planes. In this way, positive elastokinematic characteristics of the wheel guide can be ensured under the action of longitudinal and side forces on the wheel. By virtue of the fact that the second portions of the coupling element, which serve for the articulated connection of said coupling element to the body, define an axis of rotation, the coupling element can be rotated relative to the body about a set axis. Said rotational degree of freedom further improves the characteristics of the wheel guide.

In one advantageous refinement of the invention, the common coupling element is articulatedly connected to the body via a resiliently elastic element, wherein the resiliently elastic element defines the rotational mobility of the coupling element about the axis of rotation. The rotational mobility of the coupling element can be set in a simple and reliable manner by means of the resiliently elastic element.

Figure 2:
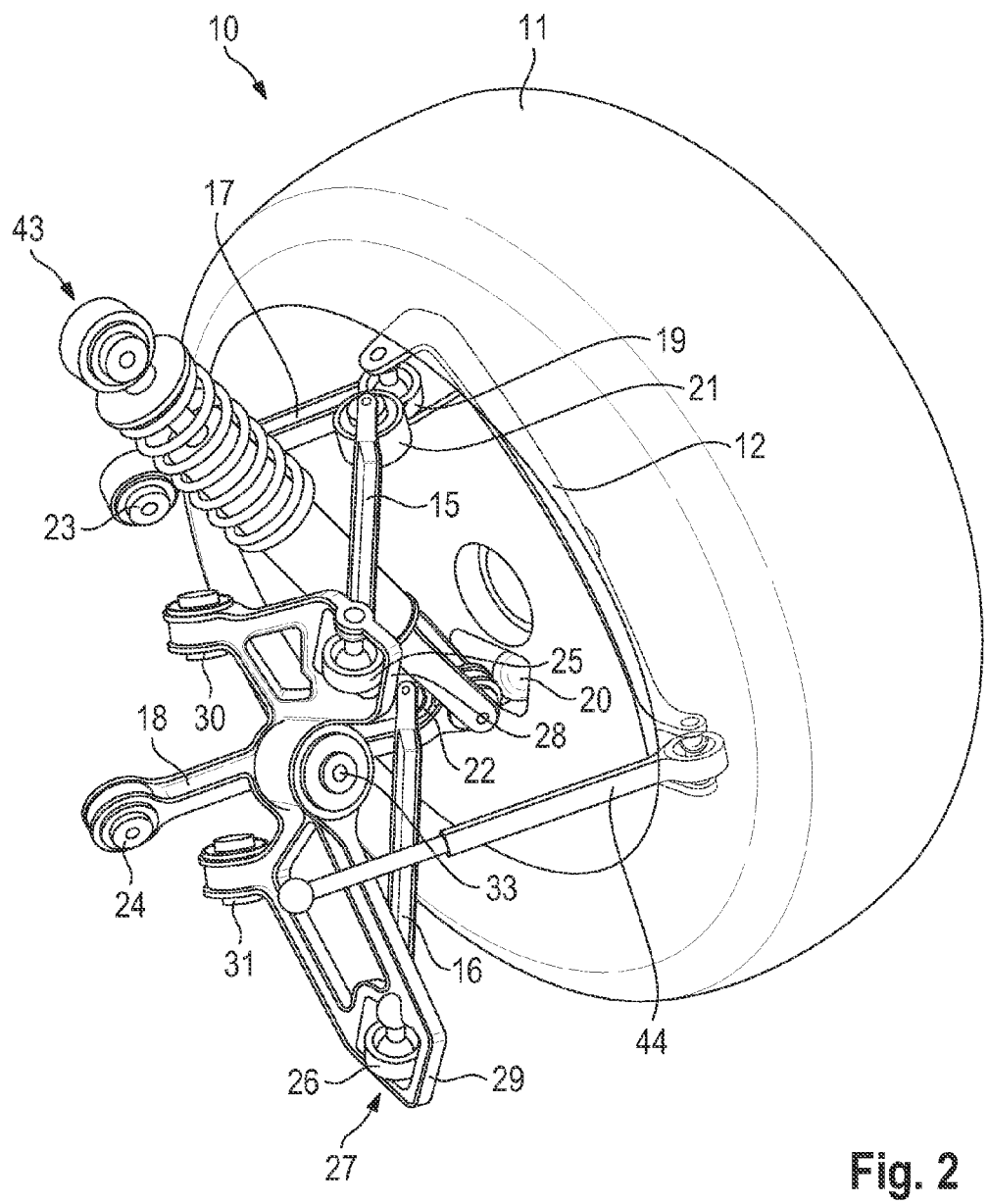
FIG. 2 shows the independent wheel suspension system according to the invention for a motor vehicle in a second perspective view.
Figure 3:
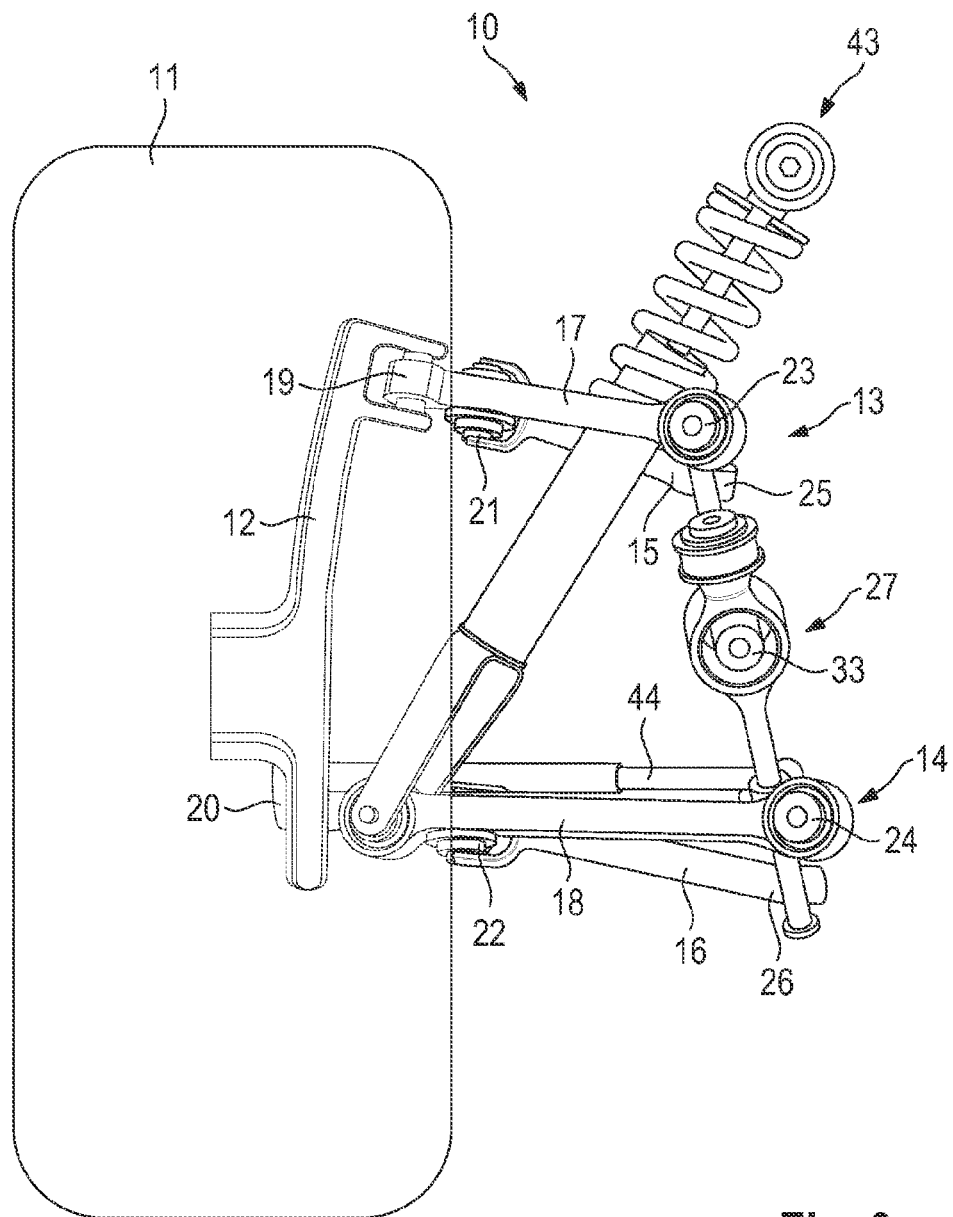
FIG. 3 shows the independent wheel suspension system according to the invention for a motor vehicle in a side view.

FIGS. 1 to 3 show different views of an independent wheel suspension system 10 according to the invention for a motor vehicle, together with a wheel 11. The independent wheel suspension system 10 for the suspension of the wheel 11 comprises a wheel holder 12, which serves for actually holding the wheel 11, and two strut planes 13 and 14, specifically an upper strut plane 13 and a lower strut plane 14. Both the upper strut plane 13 and also the lower strut plane 14 comprise in each case two separate struts, specifically in each case one longitudinal strut 15 and 16 respectively and in each case one transverse strut 17 and 18 respectively.

Each of said struts 15, 16, 17 and 18 of the strut planes 13 and 14 has a wheel-side end and a body-side end.

In the exemplary embodiment shown, the wheel-side ends 19 and 20 of the transverse struts 17 and 18 respectively of the two strut planes 13 and 14 are in each case directly articulatedly connected to the wheel holder 12, whereas the wheel-side ends 21 and 22 of the longitudinal struts 15 and 16 respectively of the two strut planes 13 and 14 are articulatedly connected to the transverse struts 17 and 18 of the respective strut plane 13 and 14, and thus indirectly via the transverse struts 17 and 18 of the respective strut plane 13 and 14 to the wheel holder 12. It is pointed out at this juncture that the wheel-side ends 21 and 22 of the longitudinal struts 15 and 16 of the two strut planes 13 and 14 may also be articulatedly connected directly to the wheel holder 12.

In the exemplary embodiment shown, body-side ends 23, 24 of the transverse struts 17, 18 of the two strut planes 13 and 14 are articulatedly connected directly to a body which is not shown in detail. By contrast, in the exemplary embodiment shown, body-side ends 25 and 26 of the longitudinal struts 15 and 16 of the strut planes 13 and 14 are articulatedly connected indirectly to the body, specifically via a common coupling element 27. The coupling element 27 is shown on its own in FIG. 4.

It is pointed out at this juncture that, by contrast to the preferred exemplary embodiment which is shown, the body-side ends of the longitudinal struts may also be articulatedly connected directly to the body, wherein the body-side ends of the transverse struts are then articulatedly connected indirectly to the body via the common coupling element.

Accordingly, in the preferred exemplary embodiment, the common coupling element 27 serves for the articulated connection of the body-side ends 25 and 26 of the longitudinal struts 15 and 16 of the two strut planes 13 and 14, and thus provides positive coupling for the longitudinal struts 15 and 16 of the two strut planes 13 and 14. Here, the body-side ends 25 and 26 of the longitudinal struts 15 and 16 of the two strut planes 13 and 14 engage articulatedly on first portions 28 and 29 of the coupling element 27. The common coupling element 27 is articulatedly connected via second portions 30 and 31 to the body, wherein said two second portions 30 and 31 together define an axis of rotation 32 about which the coupling element 27 can rotate relative to the body. Rotational mobility or a rotational degree of freedom of the common coupling element 27 about the axis of rotation 32 is provided in this way.

The common coupling element 27 is articulatedly connected to the body not only via the two second portions 30 and 31 through which the axis of rotation 32 extends but rather also via a resiliently elastic element 33 which, in the exemplary embodiment shown, is in the form of an elastic bearing. The resiliently elastic element 33 or the elastic bearing defines the rotational mobility of the coupling element 27 about the axis of rotation 32, wherein other spring elements such as for example rotary springs or hydraulically damping elastomer bearings may also be used instead of the elastic bearing shown.

The common coupling element 27 accordingly has basically five functional portions or regions, specifically the two first portions 28 and 29 for the articulated connection of the body-side ends 25 and 26 of the longitudinal struts 15 and 16 of the two strut planes 13 and 14, the two second portions 30 and 31 for the articulated connection of the coupling element 27 to the body, wherein the axis of rotation 32 which defines a rotational degree of freedom of the coupling element 27 relative to the body extends through said two second portions 30 and 31, and the elastic element 33 via which the common coupling element 27 is likewise articulatedly connected to the body, wherein the rotatability of the coupling element 27 about the axis of rotation 32 can be set by means of the spring element 33.

In the preferred structural design of the coupling element 27 shown, said coupling element has a main body 34 formed by two triangular component bodies 35 and 36. The two triangular component bodies 35 and 36 are fixedly and integrally and non-detachably connected to one another at corners 37 and 38 facing one another, specifically via the resiliently elastic element 33, wherein the resiliently elastic element 33 is accordingly formed in the connecting region of the two corners 37 and 38 of the two triangular component bodies 35 and 36.

Further corners 39 and 40 of the triangular component bodies 35 and 36 serve for the articulated connection of the body-side ends 25 and 26 of the longitudinal struts 15 and 16, wherein said corners 39 and 40 accordingly provide the first portions 28 and 29 of the coupling element 27.

Further corners 41 and 42 of the triangular component bodies 35 and 36 form the second portions 30 and 31 via which the coupling element 37 is articulatedly connected to the body.

As can be seen from FIGS. 1 to 3, the independent wheel suspension system 10 furthermore has a spring-damper system 43 and a tie rod 44. Here, the spring-damper system 43 is articulatedly connected at one side to the wheel guide (for example wheel holder 12 or to a strut plane 13 or 14—in the embodiment shown, to the lower transverse strut 18) and is articulatedly connected at the other side to the body. Details of the articulated connection of the spring-damper system 43 and of the tie rod 44 to the wheel guide and to the body are familiar to a person skilled in the art in this field. The tie rod 44 is articulatedly connected at one side to the wheel holder 12 and, at the other side, is either a) articulatedly connected directly to the body (for example in the case of non-steered axles, preferably rear axles), or
b) articulatedly connected to the end of the (movable) toothed rack of a steering gear (for example in the case of steered axles, preferably front axles, for realizing the steering movement of the wheels).

Figure 4:
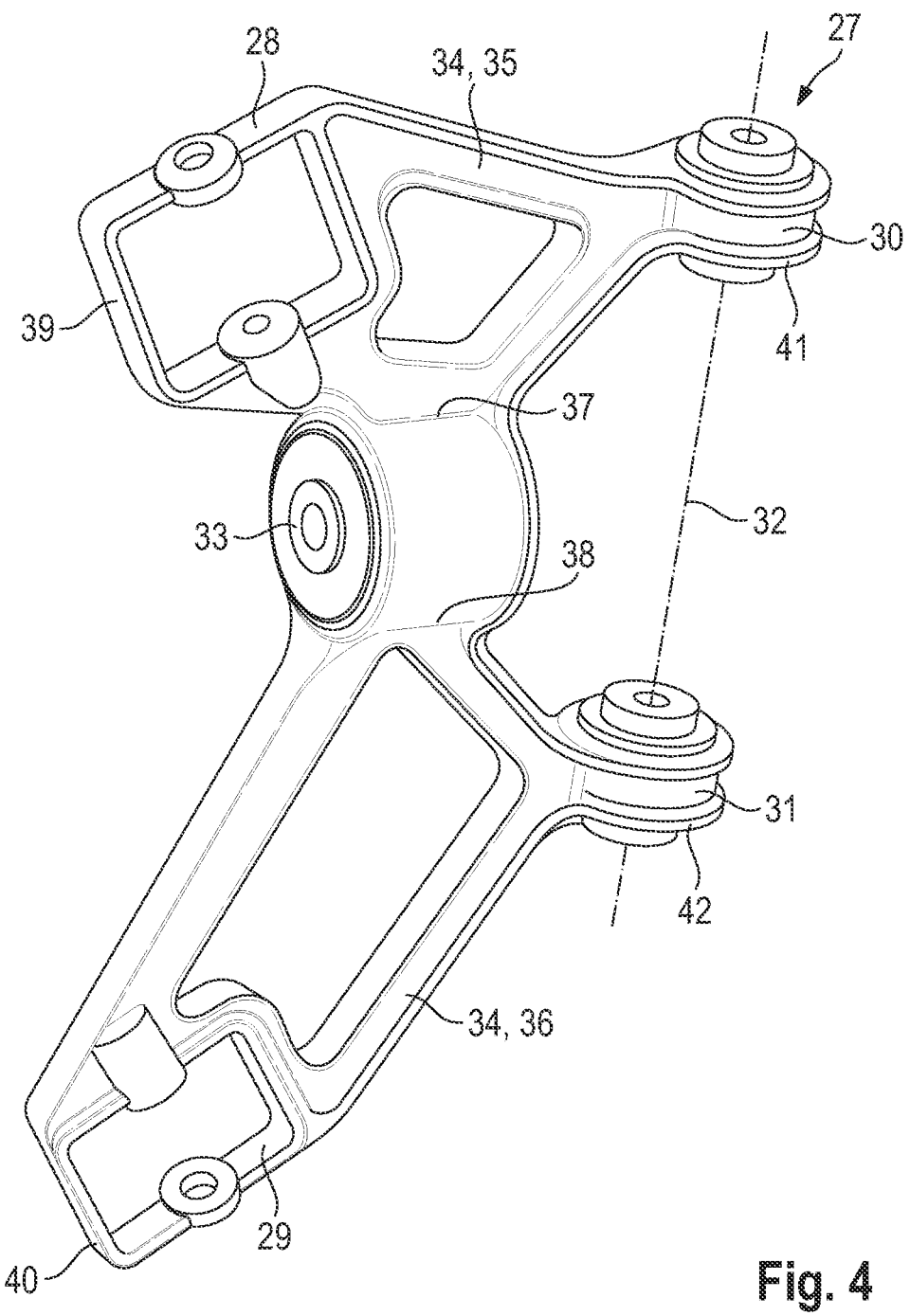
FIG. 4 shows a coupling element of the independent wheel suspension system according to the invention.

The coupling element 27 shown in FIG. 4 is of asymmetrical design. The two triangular component bodies 35 and 36 of the main body 34 accordingly have different contours and dimensions.

Figure 5:
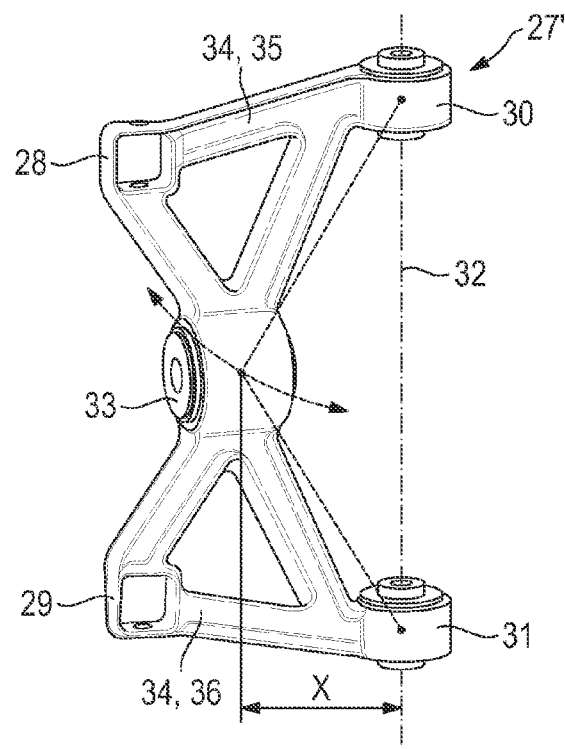
FIG. 5 shows an alternative coupling element of the independent wheel suspension system according to the invention.
Figure 6:
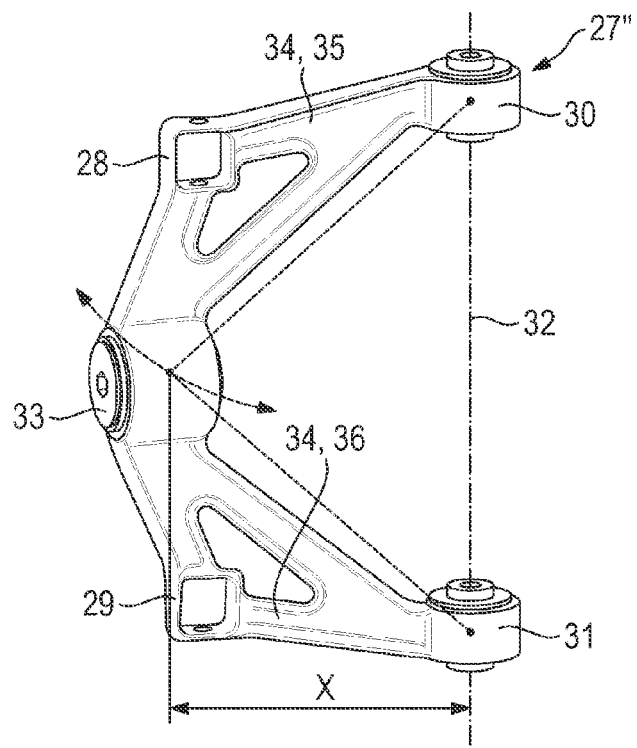
FIG. 6 shows a further alternative coupling element of the independent wheel suspension system according to the invention.

FIGS. 5 and 6 show modifications of coupling elements 27', 27" which, by contrast to FIG. 4, are of symmetrical contour, that is to say in which the two triangular component bodies 35 and 36 of the main body 34 of the respective coupling element 27' or 27" have identical contours and dimensions.

The variants of FIGS. 5 and 6 differ by a distance from the resiliently elastic element 33, which in the exemplary embodiment shown is in the form of an elastic bearing, to the axis of rotation 32 formed by the two second portions 30 and 31 of the respective coupling element 27' or 27". Said distance is visualized in FIGS. 5 and 6 by a double arrow X, wherein a so-called effective distance for the elastic bearing 33 can be set by means of said distance. Said effective distance of the elastic bearing determines a lever arm for the coupling element 27, 27' or 27".

Figure 7:
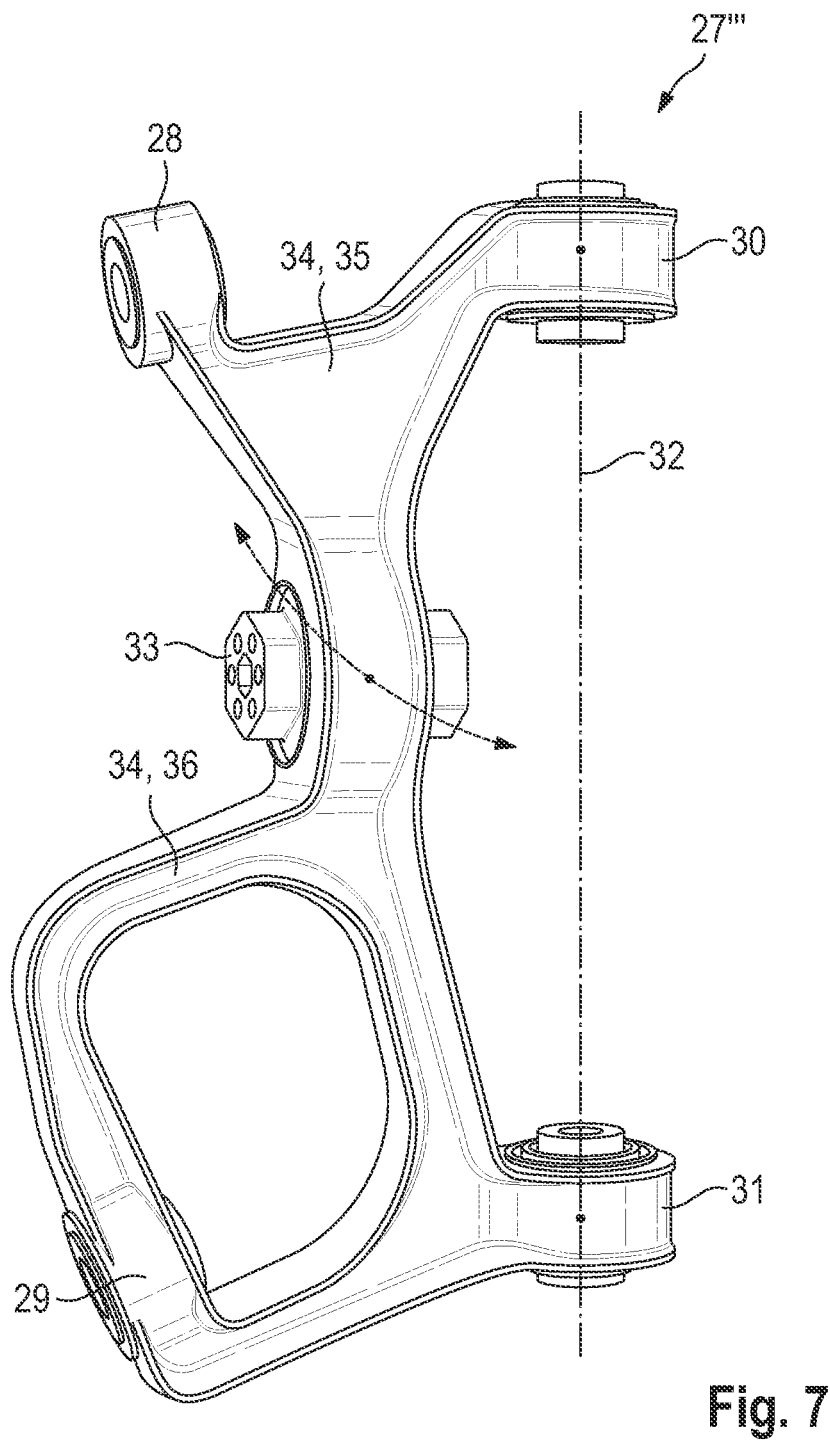
FIG. 7 shows a further alternative coupling element of the independent wheel suspension system according to the invention.

FIG. 7 shows a further modification of the coupling element 27'". By contrast to the embodiments shown in FIGS. 4 to 6, the portions 28 and 29 are in this case designed such that the longitudinal struts 15 and 16, which are to be coupled, of the strut planes 13 and 14 are fastened by means of ball pin joints connected in single-shear configuration.

The coupling element 27, 27' or 27" of the independent wheel suspension system according to the invention determines the elastokinematic characteristics of the wheel suspension. Under the action of longitudinal forces and side forces on the wheel, it is possible to realize preferred driving characteristics, wherein a small caster change under the action of longitudinal forces and a high camber stiffness under the action of side forces are ensured.

The coupling element 27, 27' or 27" generates positive coupling of the body-side ends of the two longitudinal struts 15 and 16 of the two strut planes 13 and 14 and acts, in the kinematic sense, as a crank. The coupling element 27, 27' or 27" may thus also be referred to as a coupling crank or control crank.

As already stated, the coupling element 27, 27' or 27" is rotatable relative to the body about the axis of rotation 32 which extends through the two second portions 30 and 31 of the respective coupling element 27, 27' or 27", wherein the rotational mobility about said axis of rotation 32 can be set by means of the resilient element 33, which is preferably designed as an elastic bearing.

The elastic bearing is preferably a so-called kidney bearing or hydraulic bearing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. An independent wheel suspension system for a motor vehicle, the suspension system comprising:
    an upper strut plane and a lower strut plane, each of the upper strut plane and lower strut planes including one longitudinal strut and one transverse strut, each of the struts having a wheel side end for connection of a wheel holder and a body side end for connection of a body,
    wherein the wheel-side ends of the longitudinal struts and the wheel-side ends of the transverse struts of the two strut planes are articulatedly connected to the wheel holder, the wheel-side ends of the transverse struts of the two strut planes being articulatedly connected directly to the wheel holder, and the wheel-side ends of the longitudinal struts of the two strut planes being articulatedly connected to the transverse struts of the respective strut plane so as to be articulatedly connected indirectly to the wheel holder via the transverse struts,
    wherein the body-side ends of first struts of the two strut planes are articulatedly connected directly to the body, and
    wherein the body-side ends of second struts of the two strut planes are articulatedly connected indirectly to the body via a common coupling element.

2. The independent wheel suspension system recited in claim 1, wherein the first struts of the two strut planes are the transverse struts and the second struts of the two strut planes are the longitudinal struts.

3. The independent wheel suspension system as recited in claim 1, wherein the wheel-side ends of the transverse struts of the two strut planes are articulatedly connected directly to the wheel holder, and wherein the wheel-side ends of the longitudinal struts of the two strut planes are articulatedly connected directly to the wheel holder.

4. The independent wheel suspension system as recited in claim 1, wherein the body-side ends of the second struts of the two strut planes are articulatedly connected to first portions of the common coupling element, and wherein the common coupling element is articulatedly connected via second portions to the body.

5. The independent wheel suspension system as recited in claim 4, wherein the second portions of the common coupling element define an axis of rotation about which the coupling element is rotatable relative to the body.

6. The independent wheel suspension system as recited in claim 5, wherein the common coupling element is connected to the body via a resiliently elastic element, wherein the resiliently elastic element defines the rotational mobility of the coupling element about the axis of rotation.

7. The independent wheel suspension system as recited in claim 6, wherein the resiliently elastic element is formed as an elastic bearing via which the common coupling element is articulatedly connected to the body.

8. The independent wheel suspension system as recited in claim 5, wherein the common coupling element has a main body which is formed by two triangular component bodies which are connected to one another at two corners facing one another, wherein the resiliently elastic element is formed in a region of the corners of the triangular component bodies at which the component bodies are connected to one another.

9. The independent wheel suspension system as recited in claim 8, wherein further corners of the triangular component bodies provide the articulated connection of the body-side ends of the longitudinal struts to the common coupling element, and wherein additional further corners of the triangular component bodies provide the articulated connection of the common coupling element to the body.

10. The independent wheel suspension system as recited in claim 1, further comprising a spring-damper system and a tie rod which are in each case articulatedly connected to a wheel guide and to the body or to an end of a toothed rack of a steering gear.

11. A coupling element for an independent wheel suspension system of a motor vehicle, the wheel suspension system having multiple strut planes, the coupling element including:
    first portions for articulated connection of body-side ends of struts of the different strut planes of the independent wheel suspensions system; and
    second portions for articulated connection of the coupling element to a body of the motor vehicle,
    wherein the second portions define an axis of rotation about which the coupling element is rotatable relative to the body,
    wherein the coupling element is connectable to the body via a resiliently elastic element,
    wherein the resiliently elastic element defines a rotational mobility of the coupling element about the axis of rotation,
    wherein the coupling element includes a main body which is formed by two triangular component bodies which are connected to one another at two corners facing one another,
    wherein the resiliently elastic element is formed in a region of the corners of the triangular component bodies at which the component bodies are connected to one another, wherein further corners of the triangular component bodies form the first portions for the articulated connection of the body-side ends of the respective struts to the coupling element, and
    wherein additional further corners of the triangular component bodies form the second portions for the articulated connection of the coupling element to the body.

12. The coupling element as recited in claim 11, wherein the resiliently elastic element is formed as an elastic bearing via which the coupling element is articulatedly connectable to the body.

* * * * *